United States Patent [19]

Brown et al.

[11] 3,775,648

[45] Nov. 27, 1973

[54] BRUSHLESS MOTOR CONTROL

[75] Inventors: Eugene C. Brown, Palos Verdes Peninsula; Donald L. Carter, Torrance, both of Calif.

[73] Assignee: The Garrett Corporation, Los Angeles, Calif.

[22] Filed: Aug. 4, 1971

[21] Appl. No.: 168,807

[52] U.S. Cl. ................. 318/138, 318/254, 317/48
[51] Int. Cl. ............................................. H02p /7
[58] Field of Search .................... 317/48; 318/138, 318/254, 326

[56] References Cited
UNITED STATES PATENTS

| | | | |
|---|---|---|---|
| 3,663,877 | 5/1972 | Clark | 318/326 |
| 3,423,658 | 1/1969 | Barrus | 318/254 |
| 3,463,985 | 8/1969 | Fredriksen | 318/254 |
| 3,619,746 | 11/1971 | Thornton | 318/138 |

*Primary Examiner*—Bernard A. Gilheany
*Assistant Examiner*—Thomas Langer
*Attorney*—Robert H. Fraser et al.

[57] ABSTRACT

A brushless DC motor control system is provided in which auxiliary sense windings within the stator portion of the motor derive reference signals in response to rotation of the rotor. The reference signals are shifted in phase by a predetermined amount and shaped to provide generally rectangular waveforms prior to having the true and complementary values thereof combined by logical gating circuitry so as to selectively gate a plurality of power amplifiers which are associated with and which energize different ones of the main motor or stator windings. In the particular embodiment disclosed the reference signals are delayed 90° so as to be in-phase with selected pairs of the main motor windings and thereby establish a correct sequence of logical gating for the power amplifiers when the motor is rotating in one direction. The reference signals as delayed 90° are out-of-phase with certain pairs of the main motor windings to prevent rotation of the motor in the opposite direction. A starting circuit provides acceleration of the motor in the desired direction from rest or from a stalled condition by providing artificial reference signals which are gated to the power amplifiers to provide energization of the main windings on a random basis.

17 Claims, 15 Drawing Figures

FIG.—1

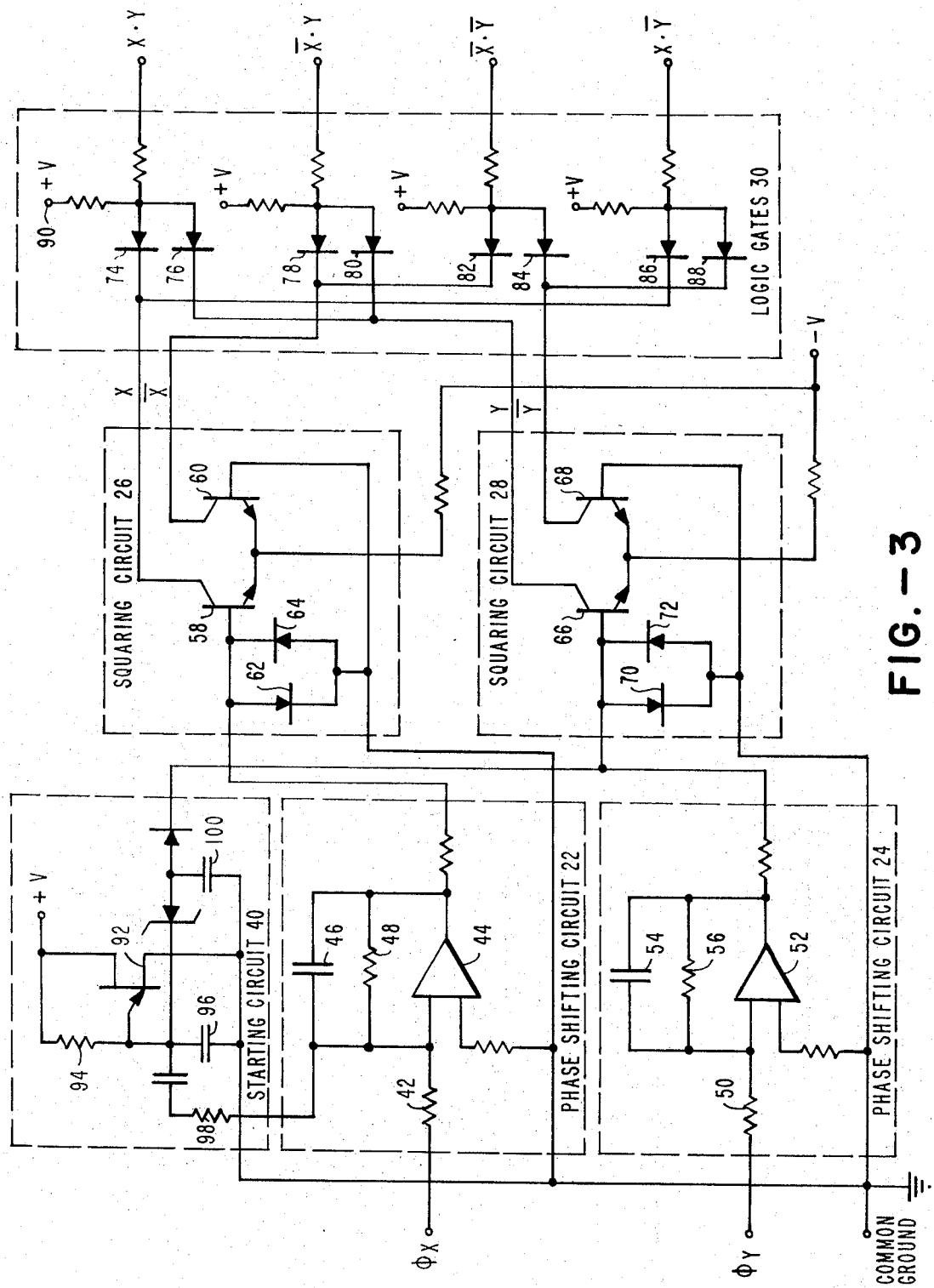

BRUSHLESS MOTOR CONTROL

BACKGROUND OF THE INVENTION

1. Field of the Invention

The present invention relates to motor control circuits, and more particularly to control circuits for brushless DC motors.

2. History of the Prior Art

Brushless motors have found wide application in situations where a device such as a pump or fan is to be driven in one direction only. Such motors utilize means located within the stator or stationary portion of the motor which do not physically contact the rotatable portion or rotor but which nevertheless sense the rotational position of the rotor relative to the stator. The information provided by such sensing means is used to energize the main or stator windings of the motor in selected sequence so as to provide in effect a rotating magnetic field and consequent operation of the motor.

One prior art technique of brushless DC motor control involves the use of semiconductor devices including Hall effect devices placed within the motor in the vicinity of the rotor. Such devices are employed to sense the rotational position of the rotor and thereby sequentially energize the main motor windings.

A different prior art technique of brushless DC motor control which has found widespread use, particularly for aerospace applications, involves the use of solid state light emitting diodes and photo detecting transistors in association with a rotating shutter attached to the motor shaft or rotor. This technique has certain advantages over the other types of position sensing schemes, but at the same time suffers from many of the disadvantages common to such other schemes.

One major disadvantage of such prior art position sensing schemes is in the location within the motor of a sensing device or devices subject to wear, early failure or other deterioration. In the case of the opto-electronic devices described, it is not uncommon for fog, smoke or other airborne contaminants, condensates of various vapors including water and perspiration and deposits resulting from the outgassing of various materials in a vacuum such as the outgassing of grease in nearby motor bearings to cloud the lenses and thereby adversely affect the sensitivity of the circuit. Such photo-optical components, moreover, are temperature sensitive and are typically restricted to a temperature range of operation from about −65° to +80° C., thereby impairing the versatility of the system. Utilization of opto-electronic devices has been found to be further limited to use in other than radioactive environments where the performance of the photo-optical devices are not restricted by radioactive or similar radiation. The entire supporting structure for the optical components of such systems must be constructed with the precision and care of fine optical instruments utilizing very stringent tolerances. This further adds to the expense and complexity of such systems. Such factors as well as others result in brushless motor arrangements in which the rotor position sensing systems are the least reliable of all the components used.

One serious limitation of most prior art DC brushless motor control systems is the inability of such systems to limit motor operation to a single desired direction. Accordingly it is sometimes the case that a motor which has stalled or otherwise been brought to rest is accelerated in the wrong direction due to the inability of the position sensing system to discriminate between opposite directions of rotation of the motor. This may result in damage or destruction of the device to which the motor is coupled or at the very least the improper operation of such device.

Accordingly it is an object of the present invention to provide an improved brushless motor control system.

A further object of the invention is to provide a brushless motor control system which allows operation of the motor only in a single given direction.

A further object of the invention is to provide a brushless motor control system which does not locate semiconductor, optical or other sensitive devices within the motor.

A still further object of the present invention is to provide a brushless motor control system which is durable and highly reliable during prolonged use.

BRIEF DESCRIPTION OF THE INVENTION

Briefly the present invention provides a brushless motor control system in which one or more sense windings are located within the motor adjacent the main or stator windings so as to electromagnetically derive reference signals representing the rotational position of the rotor. The reference signals are shifted in phase by a fixed amount and are shaped prior to being applied to logic gating circuitry where they are combined so as to selectively gate power amplifiers and thereby control the energization of the main motor windings in a selected sequence. With the motor rotating in the proper direction the phase shifted reference signals are in-phase with selected ones of the main motor windings and the reference signals are combined in the logic gates to provide gating of the power amplifiers in a fashion which effectively provides a rotating magnetic field about the main motor windings to effect operation of the motor. In the event the motor begins to operate in the wrong direction the phase shifted reference signals are out-of-phase with the corresponding main windings. This results in the gating of the power amplifiers so as to energize the main motor windings and apply a reverse torque to bring the motor to rest. A stalled motor or one which is otherwise at rest is started by a circuit which generates a time varying signal which is applied to the logic gating circuitry and which acts as noise so as to initiate a random gating of the power amplifiers. If this gating results in initiation of motor operation in the wrong direction the system quickly corrects itself by responding to subsequent signals from the starting circuitry so as to randomly effect still other gating sequences until the sequence is found which accelerates the motor to operational speed in the proper direction of operation.

In one preferred arrangement of a control circuit in accordance with the invention the reference signals as derived by the sense windings are integrated so as to delay the phase thereof by 90° prior to being applied to squaring circuits which produce true and complementary squarewaves in response thereto. The squarewaves are applied to logic gates where they are logically combined to provide gating signals for a plurality of different power amplifiers coupled to different ones of the main motor windings. A starting circuit comprising a relaxation oscillator and associated circuitry generates a ramp waveform which is applied as a phase shifted reference signal to one of the squaring circuits to initiate a sequence of energization of the main motor windings whenever the motor is at rest. The starting circuit is turned off automatically whenever the motor reaches a selected fraction of full speed in the proper direction.

BRIEF DESCRIPTION OF THE DRAWINGS

FIG. 3 is a schematic diagram of circuitry which may comprise a portion of the arrangement of FIG. 1.

DETAILED DESCRIPTION

Motor control arrangements in accordance with the invention utilize one or more sense windings located within the motor in combination with electronic circuitry located outside of the motor and in any event removed from the environment within the motor which is deleterious to the components placed there by many prior art control systems. The sense windings may actually comprise some of the main or stator motor windings themselves, in which event such main motor windings function both as the main motor windings and as the auxiliary windings to provide the reference signals. However to avoid interference with the proper and normal functioning of such main motor windings, the sense windings preferably comprise separate auxiliary windings disposed in close association with the main motor windings in the stator portion of the motor.

Figure 1:
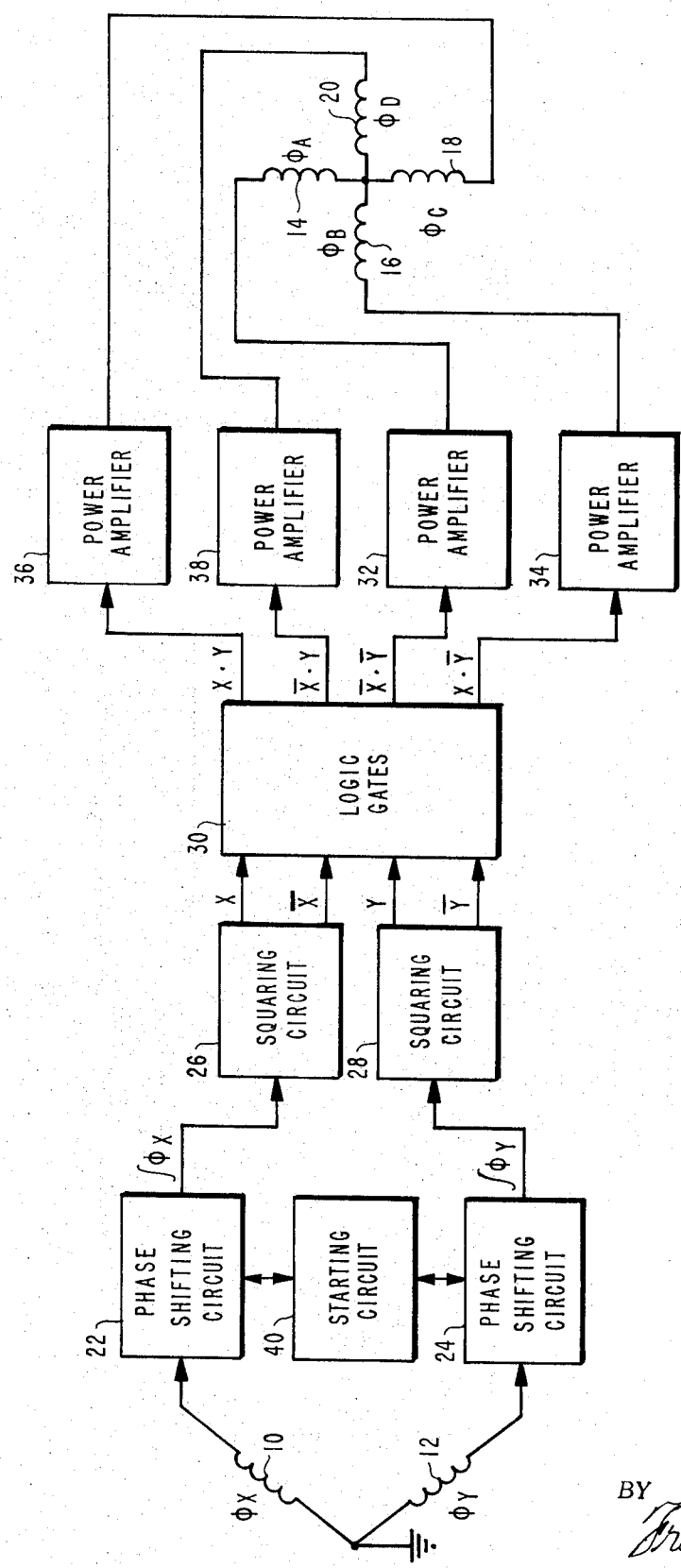
FIG. 1 is a block diagram of one preferred arrangement of a brushless motor control circuit in accordance with the invention.

In the arrangement of FIG. 1 which assumes a four-phase, half-wave DC motor, two auxiliary sense windings 10 and 12 derive reference signals $\phi_X$ and $\phi_Y$ respectively in response to rotation of the rotor of the motor. The motor includes four main or stator windings 14, 16, 18 and 20 which correspond respectively to the four different phases of operation $\phi_A$, $\phi_B$, $\phi_C$ and $\phi_D$ of the motor. The windings 14, 16, 18 and 20 which are spaced about the stator are separated by approximately 90°.

The various windings 10, 12, 14, 16, 18 and 20 are shown oriented in FIG. 1 in the same way in which they are mounted within the motor relative to the axis of rotation of the rotor. Thus the sense windings 10 and 12 each form angles of 45° with respect to two of the main motor windings and 90° with respect to one another.

The motor rotor may comprise any appropriate conventional structure for producing one or more magnetic fields on which the stator windings 14, 16, 18 and 20 may operate to produce torque. A typical conventional arrangement for the rotor comprises a permanent magnet having a plurality of magnetic poles.

Figure 2:
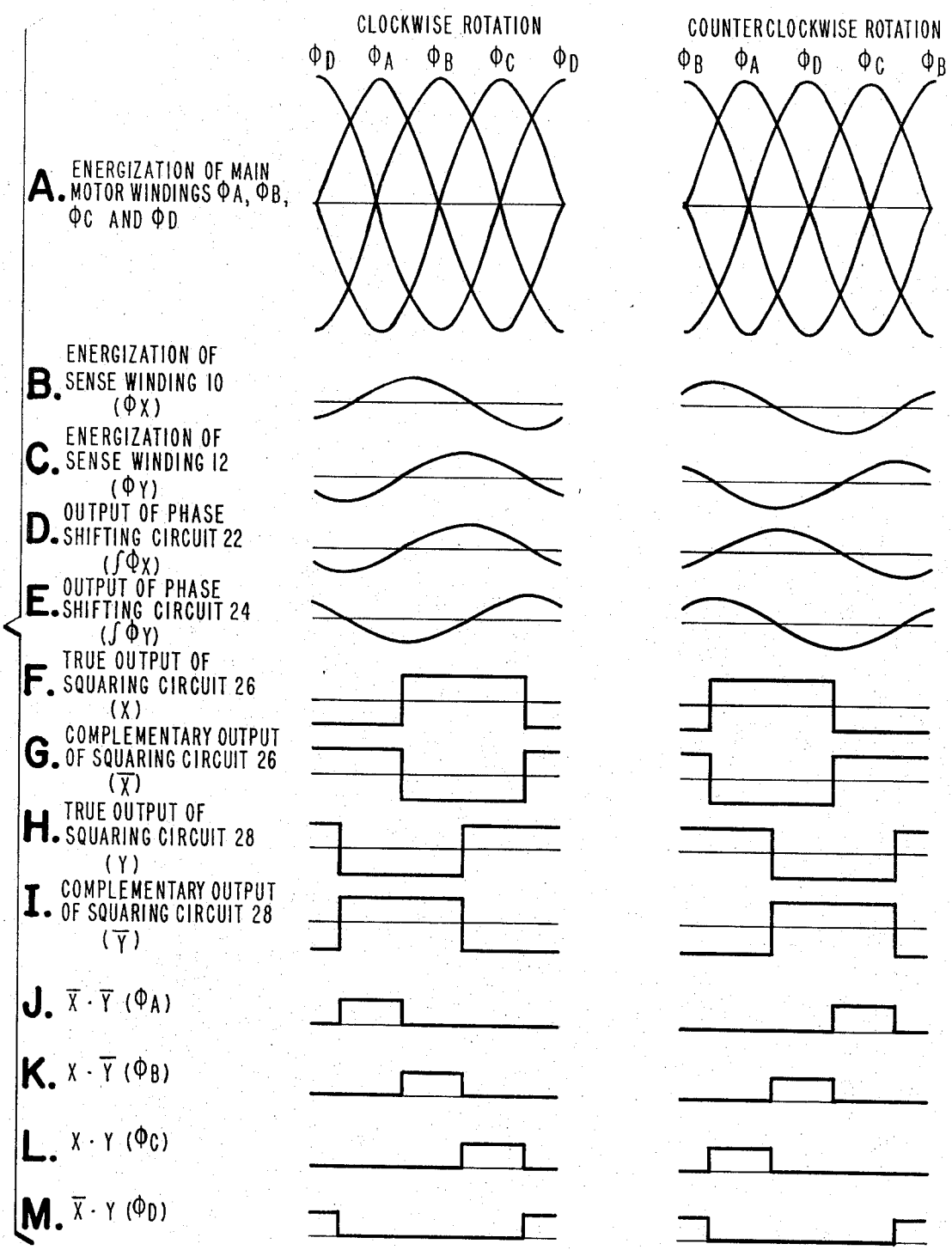
FIGS. 2A–2M are waveforms useful in explaining the operation of the arrangement of FIG. 1.

A single cycle of each of the four phases of the motor is illustrated in FIG. 2A for both clockwise and counterclockwise rotation of the motor. For purposes of present discussion it is assumed that clockwise rotation is the desired direction of rotation and that the opposite or counterclockwise rotation is unwanted. As will be seen from the discussion to follow, counterclockwise rotation is prevented by control circuit systems in accordance with the invention. As seen in FIG. 2A each of the motor phases is displaced 90° from the adjacent phases. When the motor undergoes clockwise rotation the four phases are encountered in the order $\phi_A$, $\phi_B$, $\phi_C$ and $\phi_D$, at which point the order is repeated. However in the case of counterclockwise rotation the phases occur in the order $\phi_A$, $\phi_D$, $\phi_C$ and $\phi_B$. Thus while the phases $\phi_A$ and $\phi_C$ occur in the same phase position for counterclockwise rotation as in the case of clockwise rotation, the phases $\phi_D$ and $\phi_B$ are reversed in position so as to effectively change places with one another.

If the motor is rotating in a clockwise direction the sense winding 10 responds by generating a signal voltage of generally sinusoidal waveform as shown in FIG. 2B. Because of the location of the winding 10 at angles of 45° with respect to two of the main motor windings, the voltage waveform of FIG. 2B is delayed by 45° as shown. Conversely when the rotor attempts to rotate in a counterclockwise direction the resulting voltage waveform as seen in the second part of FIG. 2B is advanced by 45° relative to the phases of the main motor windings. The sense winding 12 being 90° out-of-phase with the winding 10 generates the voltage waveforms shown in FIG. 2C.

In accordance with the invention the reference signals $\phi_X$ and $\phi_Y$ are applied to phase shifting circuits 22 and 24 where they are integrated to provide a 90° phase delay. The resulting signals $\int \phi_X$ and $\int \phi_Y$ are shown in FIGS. 2D and 2E respectively.

It will be noted from FIG. 2B that the peak of the reference signal $\phi_X$ occurs between the A and B phases of the motor for both clockwise and counterclockwise rotation. However the phase shifted signal $\int \phi_X$ as seen in FIG. 2D has a peak which occurs between the B and C phases for clockwise rotation and between the A and D phases for counterclockwise rotation. Similarly the reference signal $\phi_Y$ has a peak occurring between the B and C phases for both clockwise rotation and counterclockwise rotation as seen in FIG. 2C, yet the phase shifted signal $\int \phi_Y$ as seen in FIG. 2E has a peak occurring between the C and D phases for clockwise rotation and the A and B phases for counterclockwise rotation. This phenomenon which results from the 90° phase delay is utilized in accordance with the invention to provide a power amplifier gating sequence which will allow rotation only in the desired or clockwise direction as will become apparent from the discussion to follow.

The phase shifted reference signals $\int \phi_X$ and $\int \phi_Y$ are applied respectively to squaring circuits 26 and 28 where they are converted into squarewaves having zero crossings corresponding to those of the sinusoidal waveforms $\int \phi_X$ and $\int \phi_Y$. The squaring circuit 26 squares the waveform of the signal $\int \phi_X$ to provide a signal X as seen in FIG. 2F and its complement $\overline{X}$ as seen in FIG. 2G. The squaring circuit 28 squares the waveform of the signal $\int \phi_Y$ to provide a signal Y as seen in FIG. 2H and its complement $\overline{Y}$ as seen in FIG. 2I.

The signals X, $\overline{X}$, Y and $\overline{Y}$ are applied to logic gates 30 which logically AND different combinational pairs of the signals to provide $X \cdot Y$, $\overline{X} \cdot Y$, $\overline{X} \cdot \overline{Y}$ and $X \cdot \overline{Y}$ as shown in FIG. 1. The signals of FIGS. 2F, 2G, 2H, and 2I at the inputs of the logic gates 30 are assumed to be TRUE or ON when positive and FALSE or OFF when negative. The resulting gating signals of FIGS. 2J, 2K, 2L and 2M are of zero value except during the quarter period when the two input signals comprising that signal are both TRUE. As shown, each of the resulting signals at the outputs of the logic gates 30 comprises a pulse of 90° duration. These signals are applied as gating signals to power amplifiers 32, 34, 36 and 38 which respectively control the energization of the main motor windings 14, 16, 18 and 20. The pulse of FIG. 2J for clockwise rotation occurs during the A phase so as to energize the A phase winding 14. Similarly the pulses of FIGS. 2K, L and M respectively energize the windings 16, 18 and 20 during the B, C and D phases of the motor for clockwise rotation. This sequence of energization provides in effect a rotating magnetic field about the main motor windings to provide motor operation in the clockwise direction.

In the case of undesired or counterclockwise rotation the signals of FIGS. 2K and 2M energize the B and D phase windings 16 and 20 during the B and D phases to produce torques which encourage rotation of the motor in this direction. However as seen in FIG. 2K the pulse which results in energization of the B winding 16 causes such energization to occur during the D phase. This results in a torque which directly opposes rotation of the motor in this direction. Similarly the pulse shown in FIG. 2L results in the energization of the C winding 18 during the A phase so as to again result in a torque opposing rotation of the motor in this direction. These torques stop the motor and prevent it from accelerating in the undesired or counterclockwise direction.

One problem with many prior art motor control systems designed for use with motors to be operated in a single direction is that such systems fail to distinguish between the opposite directions of operation. While some such systems employ elaborate schemes for insuring that motor operation is initiated in the proper direction, they do not safeguard against the possiblity that the motor may stall or otherwise come to rest, and then inadvertently accelerate in the wrong direction. It will be seen that in accordance with the invention any attempt to operate the motor in the wrong direction results in the application of opposing torques to quickly decelerate and stop the motor.

The sense windings 10 and 12 respond to the rotor to produce the reference signals $\phi_X$ and $\phi_Y$ only so long as the rotor is rotating. When the motor is at rest no reference signals are present so as to provide energization of the main motor windings. Accordingly the motor is started in accordance with the invention by a starting circuit 40 coupled to the phase shifting circuits 22 and 24. The starting circuit 40 generates a time varying signal which is applied as the reference signal $\int \phi_X$ to the squaring circuit 26. This results in a random gating of the power amplifiers 32, 34, 36 and 38. If the motor begins to rotate in the wrong direction the resulting opposing torques quickly decelerate the motor and bring it to rest in the manner previously described. At the same time the logic gates 30 and sensing circuit 26 respond to subsequent signals from the starting circuit 40 to produce still different gating sequences. As a result the motor may rotate back and forth several times until such time as a proper gating sequence for clockwise rotation results. The starting circuit 40 responds to rotation of the motor in the proper direction and terminates generation of the time varying signal when the motor speed reaches a selected value such as 0.1 percent of its normal operating speed.

One preferred circuit which may comprise the phase shifting circuits 22 and 24, the squaring circuits 26 and 28, the logic gates 30 and the starting circuit 40 is schematically illustrated in FIG. 3. In the arrangement of FIG. 3 each of the phase shifting circuits 22 and 24 comprises an integrator. The integrator of the phase shifting circuit 22 includes a resistor 42 which couples the reference signal $\phi_X$ to the input of an operational amplifier 44 having a capacitor 46 coupled thereacross. A resistor 48 is also coupled across the operational amplifier 44 to provide DC feedback. Similarly the integrator comprising the phase shifting circuit 24 includes a resistor 50 for coupling the reference signal $\phi_Y$ to the input of an operational amplifier 52 having a capacitor 54 coupled thereacross. A resistor 56 is also coupled across the differential amplifier 52 to provide DC feedback.

Motor control systems in accordance with the invention need not necessarily shift the phase of the reference signals by delaying them but can instead advance the phase of the reference signals where desired. If the phase of the reference signals is to be advanced rather than retarded the integrators comprising the phase shifting circuits 22 and 24 are replaced by differentiators which provide a phase advancement by a desired amount such as 90°.

The squaring circuit 26 includes a pair of transistors 58 and 60 coupled in common emitter fashion. The bases of the transistors 58 and 60 are respectively coupled to the output of the operational amplifier 44 and to ground. The collectors of the transistors 58 and 60 are coupled to the logic gates 30 so as to respectively provide the signals X and $\bar{X}$. A pair of diodes 62 and 64 are coupled back-to-back between the output of the operational amplifier 44 and ground to limit voltage excursions at the bases of the transistors 58 and 60. The transistors 58 and 60 undergo alternate conduction and nonconduction in response to the output of the operational amplifier 44. This results in the turning off of the transistor 58 to provide the signal X with a TRUE or positive value whenever the sinusoidal output of the operational amplifier 44 is positive. Similarly the transistor 60 turns off to make $\bar{X}$ positive whenever the sinusoidal output of the operational amplifier 44 is negative.

The squaring circuit 28 which is identical to the circuit 26 includes a pair of transistors 66 and 68 and a pair of diodes 70 and 72 coupled to operate in the same manner as the components of the circuit 26 to produce Y and $\bar{Y}$ in response to the output of the operational amplifier 52.

The logic gates 30 comprise diodes 74, 76, 78, 80, 82, 84, 86 and 88 coupled between a positive power supply terminal and the collectors of the different transistors 58, 60, 66 and 68 to logically combine the signals X, $\bar{X}$, Y and $\bar{Y}$ in the desired fashion. For example, the diodes 74 and 76 are respectively coupled between a positive power supply terminal 90 and the collectors of the transistors 58 and 66 to produce the value X · Y.

The starting circuit 40 incudes a unijunction transistor 92 coupled through a resistor 94 to a positive power supply terminal and through a capacitor 96 to ground. This circuit defines a relaxation oscillator which provides a voltage of generally ramp-like waveform to the operational amplifier 44 via a resistor 98 causing perturbations in the output of the amplifier 44 and thereby forcing signals to appear at the outputs of the various logic gates 30. As described previously the gating signals so produced cause the motor to begin to move, which in turn results in the sense windings 10 and 12 providing reference signals $\phi_X$ and $\phi_Y$ to the phase shifting circuits 22 and 24. In this respect the motor control system in accordance with the invention provides for self-sustaining motor operation. As previously described the initial gating sequence produced by operation of the starting circuit 40 may result in a tendency to accelerate the motor in the wrong direction, which tendency is quickly compensated for by the phase shifted reference signals in accordance with the invention. Accordingly, in the worse case the motor may rock back and forth several times until a gating sequence is established tending to accelerate the motor in the desired direction. In this respect the relaxation oscillator within the starting circuit 40 effectively generates noise to produce action of the motor which may be favorable or unfavorable but which in any event produces rotation of the motor such that the reference signals $\phi_X$ and $\phi_Y$ are produced. When the motor has accelerated in the desired direction to a preselected percentage of normal operating speed the output of the operational amplifier 52 charges a capacitor 100 in the starting circuit 40 to a negative voltage thereby disabling the relaxation oscillator.

It will be appreciated by those skilled in the art that various changes and modifications of the DC brushless motor control system described may take place without departing from the invention. Thus, the number of sense windings used may vary depending on the number of motor phases and their interrelationships with the motor windings. For that matter, the position of the sense windings relative to the stator windings may be varied to alter the electrical characteristics of the motor and the amplifiers. As previously noted, the phase shifting circuits may comprise circuits such as integrators which delay the phase or circuits such as differentiators which advance the phase. Regardless of whether the phase of the reference signal is advanced or retarded, however, it is desirable that circuitry such as the integrators shown and described be used which maintains the phase shift relatively constant with respect to frequency. In some cases the main motor windings may also be used as sense windings, as previously noted. However some reduction in performance occurs as the result of waveform distortion due to motor drive current.

Thus, while the invention has been particularly shown and described with reference to preferred embodiments thereof, it will be understood by those skilled in the art that various changes in form and details may be made therein without departing from the spirit and scope of the invention.

What is claimed is:

1. In a motor in which first and second elements are rotatable relative to one another and the first element includes a plurality of different winding means operative to interact with the second element to produce rotation when sequentially energized, an arrangement for sensing the rotational position of the second element relative to the first element to provide energization of the plural winding means in proper sequence comprising:

means responsive to rotation of the second element relative to the first element for generating a plurality of alternating reference signal having a known phase relationship to the plural winding means;
means responsive to the alternating reference signals for generating a plurality of corresponding signals having a different phase from the reference signals;
means responsive to the corresponding signals for logically combining the corresponding signals to produce a plurality of gating signals; and
means responsive to the gating signals for selectively energizing the plural winding means in a sequence determined by the gating signals.

2. The invention defined in claim 1 above, wherein the means for generating a plurality of alternating reference signals includes a plurality of sense windings disposed within the first element and adjacent the second element.

3. The invention defined in claim 1 above, wherein the means for generating a plurality of alternating reference signals includes at least two of the plurality of different winding means.

4. The invention defined in claim 1 above, wherein the means for generating a plurality of corresponding signals comprises means for integrating the alternating reference signals and means for generating the complement of the integrated alternating reference signals.

5. The invention defined in claim 1 above, further including means responsive to the absence of relative rotation between the first and second elements for applying a signal of varying waveform to the means for generating a plurality of corresponding signals to initiate operation of the motor.

6. A brushless control circuit for a motor having a stator including a plurality of main stator windings and a rotor disposed within and rotatable relative to the stator comprising:

a plurality of sense windings mounted within the stator and operative to generate a plurality of reference signals in response to rotation of the rotor;
means responsive to each of the reference signals for generating a pair of corresponding signals which are phase displaced by substantially equal amounts and in opposite pluralities from the reference signal;
means responsive to the corresponding signals for logically combining the corresponding signals to produce a plurality of gating signals; and
means responsive to the gating signals for energizing the main stator windings in a sequence determined by the gating signals.

7. The invention defined in claim 6 above, further including means responsive to each of the corresponding signals for squaring the waveform thereof.

8. The invention defined in claim 6 above, wherein each of the means for generating a pair of corresponding signals includes means for shifting the phase of the reference signal by a selected amount and means responsive to the phase shifted reference signal for generating the complement thereof.

9. The invention defined in claim 6 above, wherein each pair of corresponding signals are displaced from the reference signal by ±90 electrical degrees.

10. The invention defined in claim 6 above, further including starting circuit means for applying an alternating signal to one of the means for generating a pair of corresponding signals whenever the rotor is at rest.

11. A brushless control circuit for a motor having a stator including a plurality of main stator windings and a rotor disposed within and rotatable relative to the stator comprising:

a plurality of sense windings mounted within the stator and operative to generate a plurality of reference signals in response to rotation of the rotor;
means responsive to each of the reference signals for shifting the phase of the reference signal by a fixed amount;

means responsive to each of the phase shifted reference signals for logically combining the phase shifted reference signals to produce a plurality of gating signals, said means being operative to logically AND each of the phase shifted reference signals and the complement thereof with all other phase shifted reference signals and the complements thereof to produce the gating signals; and means responsive to the gating signals for energizing the main stator windings in a sequence determined by the gating signals.

12. A brushless control circuit for a motor having a stator including four stator windings disposed at locations spaced approximately 90° around the stator and a rotor disposed within and rotatable relative to the stator comprising:

a pair of sense windings, each of which is disposed within the stator and forming angles of approximately 45° with a different adjacent pair of the four stator windings, each of the sense windings being responsive to rotation of the stator to generate a reference signal of generally sinusoidal waveform;

means responsive to the reference signals for shifting the phases thereof by a fixed amount to produce a pair of phase shifted reference signals X and Y;

means responsive to the phase shifted reference signals X and Y for producing the complements $\bar{X}$ and $\bar{Y}$ thereof;

means for logically combining each of the phase shifted reference signals and complements with each of the other phase shifted reference signals and complements to produce four different gating signals $\bar{X} \cdot \bar{Y}$, $X \cdot \bar{Y}$, $X \cdot Y$ and $\bar{X} \cdot Y$; and means responsive to the gating signals for energizing each of the four stator windings in accordance with the value of a different one of the four gating signals.

13. The invention defined in claim 12 above, wherein the phase shifting means comprises a pair of phase shifting circuits, each of which is coupled to receive a different one of the reference signals and comprises an operational amplifier coupled as an integrator.

14. The invention defined in claim 13 above, further including a starting circuit in the form of a relaxation oscillator coupled to be turned on to provide a signal of ramp waveform to one of the pair of phase shifting circuits whenever the rotor is at rest and responsive to the other one of the pair of phase shifting circuits to turn off whenever the rotor reaches a predetermined speed.

15. The invention defined in claim 12 above, wherein the complement producing means comprises a pair of squaring circuits, each of which is responsive to a different one of the phase shifted reference signals to convert the sinusoidal waveform of the reference signal into a squarewave and produce the complement of the squarewave.

16. The invention defined in claim 15 above, wherein each of the squaring circuits comprises a pair of transistors coupled to alternately conduct in response to the associated phase shifted reference signal, the two different transistors respectively producing the squarewave of the phase shifted reference signal and its complement.

17. The invention defined in claim 16 above, wherein the logically combining means comprises four pairs of diodes, each pair of which is coupled between a power supply and different ones of the transistor pairs within the squaring circuits to produce one of the four different gating signals.

* * * * *